United States Patent

[11] 3,603,260

| | | | |
|---|---|---|---|
| [72] | Inventor | Caldwell C. Johnson<br>Dickinson, Tex. | |
| [21] | Appl. No. | 791,268 | |
| [22] | Filed | Jan. 15, 1969 | |
| [45] | Patented | Sept. 7, 1971 | |
| [73] | Assignee | The United States of America as represented by the Administrator of the National Aeronautics and Space Administration | |

[54] STAND-OFF TYPE ABLATIVE HEAT SHIELD
7 Claims, 3 Drawing Figs.

[52] U.S. Cl. .................................................. 102/105,
244/117, 161/67
[51] Int. Cl. ........................................................ F42b 13/00
[50] Field of Search ............................................ 244/155,
117; 102/105; 161/67, 68

[56] References Cited
UNITED STATES PATENTS
3,250,661   5/1966   Walker........................ 102/105 X

*Primary Examiner*—Robert F. Stahl
*Attorneys*—Marvin F. Matthews, Edward K. Fein and G. T. McCoy ABSTRACT: An ablative heat shield for protection against aerodynamic heating of reentry spacecraft comprising a carpet having pile extending from either side of a fabric base. One side of the carpet is impregnated with the standard ablative material, constituting the heat rejection element; and the ends of the pile of the opposite side are adhesively bonded to the substructure of the spacecraft, so that the fabric base "stands off" the substructure by the length of the pile.

PATENTED SEP 7 1971 3,603,260

Caldwell C. Johnson
INVENTOR.

BY Edward K. Fein
Ivo Cox
ATTORNEYS

STAND-OFF TYPE ABLATIVE HEAT SHIELD

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to thermal protection and, more particularly, to ablative heat shield structures for protecting against very high heat loads over a relatively short time period.

2. Description of the Prior Art

When a spacecraft leaves orbital flight and reenters the earth's atmosphere, tremendous heat loads are encountered. In order to prevent the spacecraft from burning up, it must be protected from this heat. The common means of heat protection consists of covering the spacecraft with a high insulative and ablative structure, particularly at the leading edge of the craft so as to absorb, radiate, and ablate the reentry heat away from the body of the craft. The success of such a structure depends on its light weight, its ability to produce large volumes of gas upon decomposition to partly offset conduction of heat inward, a high surface emissivity to increase the amount of heat dissipated by reradiation, and a low thermal conductivity to reduce heat transfer inward and to dissipate heat by storage. Conventional ablative materials are a composite of thermosetting resins.

Operationally, several zones are formed in the ablation material during the ablative process. Closest to the bulkhead of the spacecraft is the virgin material. Above the virgin material there is a pyrolysis zone in which the resin starts to pyrolyze and form an outer char layer. Within the char layer, conduction of heat inwards toward the pyrolysis zone is partly offset by transpiration of gases outward toward the surface, and the subsequent introduction of these relatively cool gases into the external flow provides film cooling at the exposed surface. Since the char has a high carbon content, it can sustain high surface temperatures and radiate heat. Because pyrolysis occurs at relatively low temperature, there is little conduction of heat within the virgin layer; nevertheless, the virgin layer must remain thick enough so that the adhesive bond line temperature limitation will not be exceeded, insuring the integrity of the adhesive bond. Unfortunately, most known materials exhibiting the necessary characteristics have little structural integrity under the extreme conditions encountered during atmospheric reentry. Accordingly, the use of such materials alone is undesirable, necessitating the use of a structural reinforcing matrix to provide the required integrity for reentry. A previously used design incorporates a honeycombed matrix filled with the ablative material bonded to a substrate. Another design comprises an ablative material impregnated carpet adhesively bonded to a substrate.

While these designs are operable, they are not without their disadvantages. Filled honeycomb heat shields are expensive to manufacture. Because of their inherent rigidity and the necessary dimensional accuracies, they must be fabricated in place on the spacecraft structure. Furthermore, filling honeycomb cells with ablation material is a tedious and exacting operation. See U.S. Pat. No. 3,349,814 and U.S. Pat. Application Ser. No. 432,032, filed Feb. 11, 1965. The honeycomb heat shield is also relatively heavy because it must be far thicker than required for ablative purposes to prevent the adhesive bond to the substrate from overheating and weakening. Additionally, the honeycomb heat shield, being essentially monolithic, has a multitude of built-in faultlines. Because it is structurally unyielding, it has great difficulty accommodating itself to its substrate during transient thermal and load situations when the two undergo different strain patterns. This could result in massive separation from the substrate, crack propogation along the faultlines, and loss of large areas of the heat shield.

While the impregnated carpet heat shield solves most of these problems, it nevertheless exhibits the excess weight of honeycomb-type heat shield because of the excess virgin ablation material provided only to impede heat transfer to the substrate adhesive bond.

SUMMARY OF THE INVENTION

The present invention employs a high temperature resistant fiber carpet with pile extending from either side of the fabric base. The pile on one side of the carpet, the front face pile, serving as the structural reinforcing matrix, is impregnated with ablation material, constituting the heat rejection element of the heat shield. The ends of the back face pile, on the opposite side of the carpet, are adhesively bonded to the substrate such that the fabric base "stands-off" the substrate by the length of the back face pile, thus providing a controlled gap between the impregnated portion of the heat shield and the adhesive bond to the substrate. This controlled gap provides a sufficient temperature drop across the void so as to permit less ablation material to operate at a high temperature and yet not exceed the useful temperature range of the bonding adhesive. An alternate design to the back face pile provides for the controlled gap to be accomplished by weaving the carpet fabric base very loosely and dimensionally thick so as to achieve poor thermal conductivity across its thickness.

The advantages of the present invention over previous ablative heat shields include the following: (1) it is lighter weight by reason that less ablative material is required to impede heat flow to the adhesive bond; (2) it is more resistant to mechanical and thermal shock by reason that it is not rigidly attached to its substrate; (3) it is less expensive to manufacture and refurbish by reason that it will comply to dimensional inaccuracies between itself and its substrate; (4) it can more readily be removed from its substrate for refurbishing, replacing, etc., by reason that only the back face pile need be severed, as by introducing adhesive solvent in the back face void; (5) the back face void can be utilized to circulate a fluid for additional cooling or other heat exchange functions; (6) it is more readily impregnable with ablation material than honeycomb cells by reason that air does not become trapped in the pile as it does in individual honeycomb cells; and, (7) the ablation material adheres better to a structural reinforcing matrix in the form of pile than to one in the form of honeycomb cells, by reason that there is more surface area of the structural reinforcing matrix in contact with the ablation material.

BRIEF DESCRIPTION OF THE DRAWINGS

Other and further objects and features of advantage will be apparent to those skilled in the art from the following detailed description wherein reference is made to the accompanying drawings in which.

DESCRIPTION OF THE PREFERRED EMBODIMENTS

Figure 1:
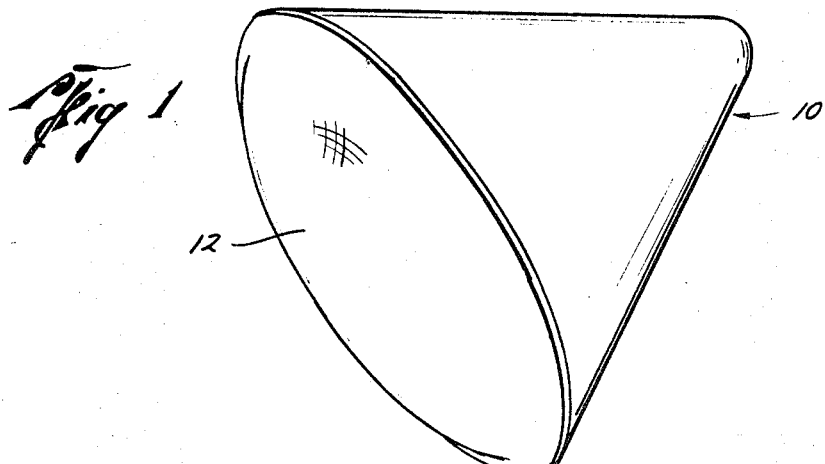
FIG. 1 is a perspective view of a spacecraft embodying the novel heat shield in accordance with this invention.

Referring in more detail to the drawings, there is shown in FIG. 1 a spacecraft 10 having a heat shield 12 mounted on the leading edge of the craft where the greatest amount of heat is generated upon the craft's reentry into the earth's atmosphere from orbital flight.

Figure 2:
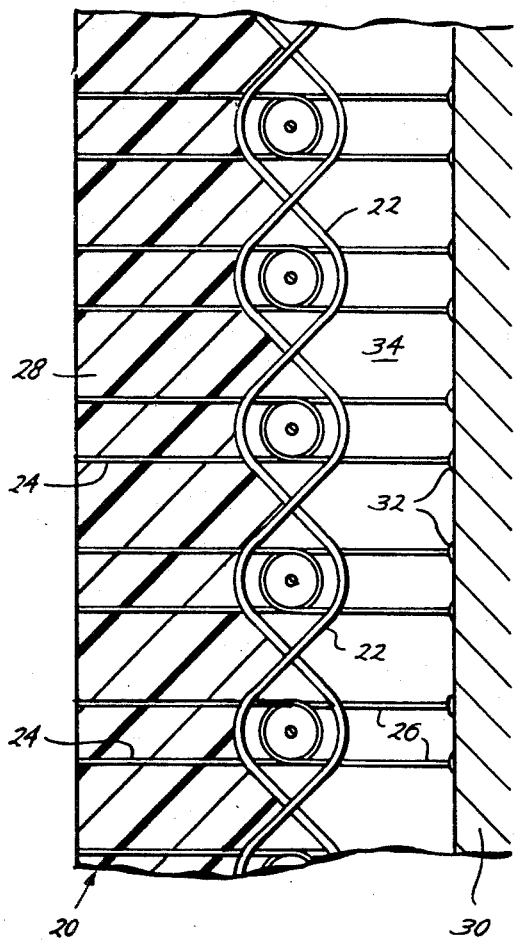
FIG. 2 is a diagrammatic sectional view of the portion of the heat shield embodying this invention.

Referring now to FIG. 2, there is depicted a preferred embodiment of the heat shield in accordance with this invention, comprising a structural reinforcing matrix in the form of a carpet 20 which includes fabric base 22, and interwoven substantially perpendicular thereto, front face pile 24 and back face pile 26. Carpet 20 is preferably woven of fibers exhibiting low thermal conductivity, good mechanical strength, and suitability for weaving, examples being glass and nylon. Back face pile 26 is of sufficient rigidity to withstand anticipated compression and shear forces caused by aerodynamic and handling loads, yet maintain minimum heat transfer. A primer may be applied to the external face of carpet to both stiffen the structure and improve its integrity. Front face pile 24 is impregnated with ablation material 28, which is any of the standard thermosetting elastomeric resins used in previous heat shield structures, such as polyurethane or a silicone rubber base type material. The pile population is generally less than that of standard commercial carpeting; however, it should be noted that the carpeting industry is equipped to adapt itself to the special requirements of this particular carpet construction. The ideal population would be a minimum count which would assure adequate debris retention, prevent spallation, assure adequate resistance to thermal and pressure shock, and simplify the impregnation of the front face pile with the various viscous ablation material compounds. A pile population of about three hundred per square inch has been found to be acceptable. While pile 24 and 26 have been described as freestanding upright members, it is also contemplated that a looped pile may be used with some additional resultant structural integrity by reason of the closed ends of the loops impregnated with the ablation material. Of course, in either case the carpet material and the ablation material should be mutually adhesive.

Impregnation of front face pile 24 with ablation material 28 may be accomplished by various well-known techniques. One method is to pour the thermosetting resin over carpet 20 which has been placed in a special mold with front face pile 24 facing upward. Applying a vacuum to the mold in the range of 28 inches for about 30 minutes has been found to remove any encapsulated air and effect very good impregnation. In the case of a polyurethane resin, curing for four hours at 200° F., plus 6 hours at 250° F., has proved satisfactory. These parameters and fabrication techniques will vary, of course, with different materials.

Impregnated carpet 20 is attached to substrate 30 by cementing outermost portions 32 of back face pile 26 to substrate 30 with any compatible adhesive. It should be noted that while substrate 30 may be any of a variety of substructures within the scope of this invention, it may also represent the bulkhead of the spacecraft such that back face pile 26 is bonded directly to the spacecraft.

The thickness of a heat shield is dictated by the heat transfer characteristics of the shield materials and the amount of heat to be encountered. For earth orbital missions, with the type of materials discussed, impregnated front face pile 24 will be in the vicinity of 1/4 inch to 1/2 inch thick. As discussed above, previous heat shields have been manufactured far thicker than necessary for ablative purposes to keep the adhesive bond below 500° F. to prevent severe weakening of the heat shield bond. This invention performs this function by providing controlled gap 34 between the impregnated portion of the heat shield, comprising front face pile 24 and ablation material 28, and substrate 30. Controlled gap 34 provides a sufficient temperature drop between fabric base 22 and the adhesive bond line indicated at 32. Although back face pile 26 is relatively stiff to withstand various forces, in order to withstand possible pressure differentials due to entrapped sea level air during ascent or outgassing during reentry heating, gap 34 may be vented to a near-static pressure source, the means for so doing not shown. To give an indication of effectiveness of this design, a gap 34 of about 0.05 inches will maintain the bond line temperature below 500° F. with the heat shield experiencing 3,000 to 4,000° F. at its outer surface and ablation material undergoing ablation at about 2,500° F. The result is the ability to provide a heat shield thinner than previous designs, operating at the same high temperatures, and yet not exceeding the useful temperature range of the attachment adhesive.

Figure 3:
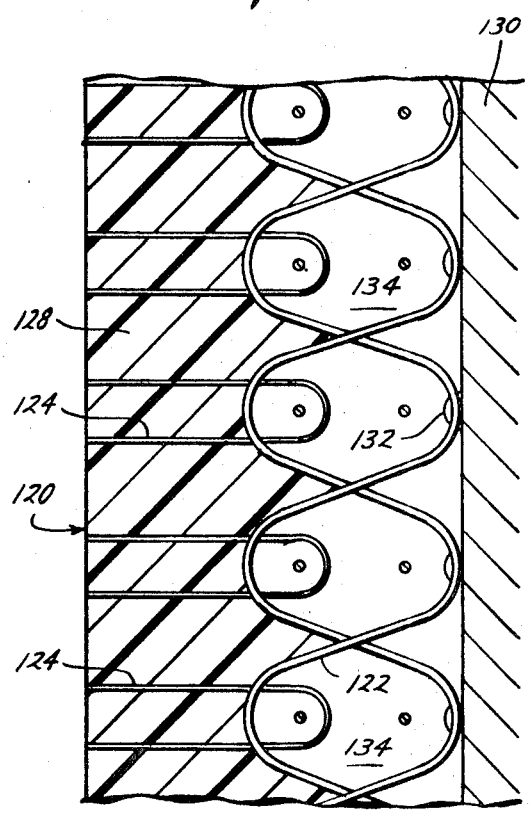
FIG. 3 is a view similar to FIG. 2 of an alternative embodiment.

An alternative embodiment of the invention is shown in FIG. 3, wherein controlled gap 134 between the impregnated portion of the heat shield, comprising front face pile 124 and ablation material 128, and substrate 130 is provided by specially weaving fabric base 122 in a controlled manner such as to achieve the required standoff of the impregnated portion. This weave should be loose enough to minimize heat conductance through the material itself, yet dense enough to maintain structural integrity. Fabric base 122 should also be woven to a dimensional thickness such that the resulting gap 134 will provide the necessary temperature drop. This loose-woven fabric base 122 would thus serve the same function as back face pile 26 of the embodiment shown in FIG. 2. Attachment to substrate 130 is effected by adhesively bonding nodes 132 of fabric base 122 to substrate 130 corresponding to attachment of back face pile 26 in FIG. 2 to its substrate 30. All other features of this alternative embodiment correspond to those described above in connection with the embodiment shown in FIG. 2.

While the heat shield is shown to cover only the forebody of the spacecraft where the greatest amount of heat is encountered, the novel heat shield could, of course, be used to cover the entire vehicle.

Moreover, while the heat shield has been described for use with spacecraft, the invention could also be used for thermal protection of other objects and in other applications where large amounts of heat are encountered.

What is claimed and desired to be secured by Letters Patent is:

1. An ablative heat shield for thermally protecting a body comprising:
   a structural reinforcing matrix including a base member having a front face and a back face, with a plurality of front face pile members substantially perpendicular to and integral with said base member;
   ablative means impregnated into said front face pile members and
   openly structured spacer means at said back face of said base member for standing off said ablative means from the thermally protected body, defining a controlled gap therebetween, when the heat shield is attached to the body.

2. The combination as set forth in Claim 1 wherein said base member is of a woven fabric and said front face pile members are interwoven therewith.

3. The combination as set forth in Claim 2 wherein said spacer means comprises a plurality of back face pile members interwoven substantially perpendicular to said base member.

4. The combination as set forth in Claim 2 wherein said spacer means comprises said fabric base member woven to a controlled looseness and dimensional thickness.

5. The combination as set forth in Claim 1 including a substrate attached to said spacer means.

6. The combination as set forth in Claim 5 wherein said substrate is attached by an adhesive bond.

7. The combination as set forth in Claim 5 wherein said substrate comprises the bulkhead of a spacecraft.